United States Patent [19]
Smith et al.

[11] Patent Number: 6,156,805
[45] Date of Patent: Dec. 5, 2000

[54] STABILIZING EMULSIONS

[75] Inventors: Philip S. Smith, Santafe de Bogota, Colombia; Julie A. Hibbert, Farnham, United Kingdom

[73] Assignee: Schlumberger Technology Corporation, Sugar Land, Tex.

[21] Appl. No.: 08/809,558

[22] PCT Filed: Aug. 30, 1995

[86] PCT No.: PCT/GB95/02034

§ 371 Date: May 10, 1999

§ 102(e) Date: May 10, 1999

[87] PCT Pub. No.: WO96/07710

PCT Pub. Date: Mar. 14, 1996

[30] Foreign Application Priority Data

Sep. 7, 1994 [GB] United Kingdom ................... 9417974

[51] Int. Cl.$^7$ .............................. B01F 3/08; B01F 17/00; C09K 3/00
[52] U.S. Cl. ................. 516/23; 516/21; 507/937
[58] Field of Search ......................... 516/21, 23; 507/937

[56] References Cited

U.S. PATENT DOCUMENTS

| | | | |
|---|---|---|---|
| 4,381,241 | 4/1983 | Romenesko et al. | 252/8.5 P |
| 4,421,656 | 12/1983 | Donatelli et al. | 252/8.5 P |
| 4,853,474 | 8/1989 | Bahr et al. | 556/445 |
| 5,707,939 | 1/1998 | Patel | 507/127 |

FOREIGN PATENT DOCUMENTS

| | | |
|---|---|---|
| 0 059 037 | 9/1982 | European Pat. Off. . |
| 0 298 402 | 1/1989 | European Pat. Off. . |
| 2 113 236 | 8/1983 | United Kingdom . |

*Primary Examiner*—Jill Warden
*Assistant Examiner*—Monique T. Cole
*Attorney, Agent, or Firm*—Gordon G. Waggett

[57] ABSTRACT

A method of stabilizing a water-in-oil emulsion, comprising the steps of:

a) preparing a composition comprising oil, water, and a silane having bonds that hydrolyse and condense to form a cross-linked polymer, thereby creating a dispsersed aqueous phase in a continuous oil phase;

b) allowing the silane to hydrolyse;

c) allowing the hydrolysed silane to condense to form a crosslinked polymer at an interface between the oil and the aqueous phase, thereby encapsulating the dispersed aqueous phase.

7 Claims, No Drawings

STABILIZING EMULSIONS

The present invention relates to stabilising emulsions, and concerns in particular a method for stabilising water-in-oil emulsions suitable for use in oil-based drilling muds.

When drilling a well, specifically an oil well, a drilling mud is employed primarily to carry rock cuttings up to the surface and out of the wellbore. Other functions of the mud are to cool and lubricate the drill bit, to protect against blowouts by counteracting downhole formation pressure, to maintain a stable borehole, and to prevent loss of fluids to the formations being drilled. Both water-based and oil-based muds are used as drilling muds. Water-based muds (WBMs) are generally cheaper than oil-based muds (OBMs), but the latter possess many operational advantages, particularly for the drilling of high angle, long reach and high pressure/high temperature wells. However, conventional oil-based muds do suffer from a number of undesirable characteristics. For example, the oil may be retained on the drill cuttings, which has unfortunate environmental implications. In addition, the presence of emulsifiers and other oil wetting agents, which are essential components of conventional OBMs (these are usually emulsions of water in oil, and the emulsifiers and wetting agents keep the emulsions stable and useful), can alter the wettability of oil-holding reservoir formations through which the borehole passes, thereby reducing their permeability to oil, and so making it more difficult to extract the oil therefrom.

Emulsifiers and oil wetting agents are added to conventional OBMs to emulsify the water phase in the oil phase, and to ensure that all of the solids in the mud are wetted by the oil. Surfactants, solids at the interface, or polymers can be used to stabilise such emulsions, and high levels of water can be stabilised in such muds, whilst maintaining all the other properties required of an oil-based mud, provided that sufficient surfactant is present. Now, the amount of oil in the mud and the oil wetting characteristics of the mud are important parameters affecting the concentration of oil retained on drilling cuttings, and unfortunately the high levels of surfactant often required result in undesirably strong oil wetting characteristics. The present invention seeks to provide an alternative way of preparing water-in-oil emulsions so that in such emulsions high water levels and high stability can still be achieved but with the use of minimal levels of surfactant. More specifically, the invention suggests that the stability of water-in-oil emulsions may be significantly enhanced by using as a stabilising agent a particular type of silane—thus, first there is formed a water-in-oil emulsion with a fine dispersed aqueous phase in the continuous oil phase, and then there is added to this a silane having bonds which hydrolyse and condense to form a cross-linked polymer at the water-oil interface.

Thus, according to the present invention there is provided a method for enhancing the stability of a water-in-oil emulsion, in which method there is added to the emulsion a silane having bonds which are capable of hydrolysing and condensing whereby a cross-linked silicone is formed at the interface between the oil and the water, thereby encapsulating the water droplets and so stabilising the emulsion.

In a second aspect, the invention provides a method for forming a stable water-in-oil emulsion, in which method:
 a) first there is formed a fine dispersed aqueous phase within a continuous oil phase, this being the desired water-in-oil emulsion; and then
 b) there is added to the emulsion a silane having bonds which are capable of hydrolysing and condensing whereby a cross-linked silicone is formed at the interface between the oil and the water, thereby encapsulating the water droplets and so stabilising the emulsion.

The water-in-oil emulsion can be prepared in any convenient way suitable for making a fine dispersion of an aqueous phase in a continuous oil phase, but preferably it is prepared by strong physical agitation of the aqueous and oil components in the presence of a suitable water-in-oil emulsifier.

Suitable emulsifiers include fatty acid soaps such as calcium dioleate, fatty amides such as the reaction products of oleic acid and diethylamine thiamine, a variety of polymeric emulsifiers containing alcohol or carboxylic acid groups or organophilic clays, and certain organic-silicone-based polymers. Such polymers can be the cross-linked organosilicone polymers disclosed in EP 0,298,402, but the preferred emulsifiers are silicone copolymers having a silicone backbone with pendant hydrophobic alkyl chains and pendant ethylene oxide/propylene oxide chains, as typified by that material known as TEGOPREN 7006 supplied by Th. Goldschmidt. This is believed to be an alkyl- and polyether-modified siloxane.

Naturally, the emulsifiers should be present at low concentrations; 0.5–50 g/l of emulsion seems acceptable.

Suitable silanes for use in the method of the present invention are those of the General Formula:

$$R_{4-n}-Si-X_n \quad (I)$$

(wherein
 R represents a straight- or branched-chain alkyl group containing from 1 to 18 carbon atoms, or an aryl group,
 X represents a R'O—, R'COO—, R'NH—, R'$_2$N—, R'=NO— or HO— group, or a halogen atom, and
 R' represents a straight- or branched-chain alkyl group containing from 1 to 8 carbon atoms, or an aryl group), and
 n is 1–3);
or of the General Formula:

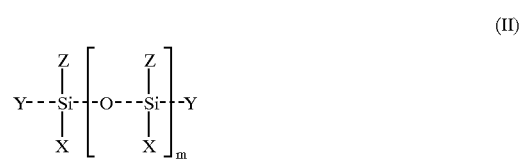

$$(II)$$

(wherein
 Y and Z represent R, R' or X, as just defined, and
 m is 0–100).

A particularly preferred silane is methyl-trimethoxy-silane (a compound of General Formula I wherein R is the methyl group, n is 3, and each X is a methoxy group).

These silanes may be used at any convenient concentration; one in the range from 0.5 to 20 g/l of emulsion seems most suitable.

The silane employed is one that hydrolyses and condenses in use. If required, a suitable catalyst—for example, an alkali such as sodium hydroxide—may be present in the aqueous phase during the addition of the silane, or alternatively an appropriate catalyst—such as an organometallic catalyst, or a metal, or metal halide, such as tin, or zinc chloride—may be present in the oil phase.

The method of the present invention is particularly suitable for stabilising emulsions which have a high water content—for example, those with an oil/water creation of up to 40/60.

By means of the methods of the present invention water droplets may be encapsulated by the cross-linked silicone, thereby isolating the water from the oil and so reducing the tendency for droplet coalescence which can lead to emulsion instability.

Although discussed here in relation to the drilling of oil well boreholes, the methods of the present invention are suitable for enhancing the stability of any water-in-oil emulsion, and other examples of these are those for use in cosmetics, in paints or in the oil-refining industry. However, the methods are particularly suitable for use in the preparation of oil-based drilling muds—OBMs—which show non-oil-wetting characteristics and acceptable rheological properties.

The present invention is further illustrated by reference to the following Example, which describes the preparation of a stabilised emulsion having an oil/brine ratio of 50:50.

EXAMPLE 1 g of TEGOPREN 7006 (supplied by Th. Goldschmidt) was dissolved in 175 ml kerosene (BP 83 HF, from BP Chemicals), with minimal mixing. 175 ml of calcium chloride brine was then emulsified into the kerosene using either a Hamilton Beach mixer or a Ystral high shear blender, and the resultant emulsion allowed to cool to room temperature.

After cooling, 3 g of methyl-trimethoxy-silane was added in a short but vigorous mixing procedure, and the resultant emulsion was left for approximately 30 mins to allow cross-linking to take place.

The final emulsion this formed was stable, and suitable for use as a drilling fluid.

What is claimed is:

1. A method of stabilizing a water-in-oil emulsion, comprising the steps of
   (a) preparing a composition comprising oil, water, and a silane having bonds that hydrolyse and condense to form a cross-linked polymer, thereby creating a dispersed aqueous phase in a continuous oil phase;
   (b) letting said silane hydrolyse;
   (c) letting said hydrolysed silane condense to form a crosslinked polymer at an interface between said oil and said aqueous phase, thereby encapsulating said dispersed aqueous phase.

2. The method of claim 1, in which the water-in-oil emulsion is prepared by physical agitation of the aqueous and oil components in the presence of a suitable water-in-oil emulsifier.

3. The method of claim 2, in which the emulsifier is a silicone copolymer having a silicone backbone with pendant hydrophobic alkyl chains and pendant ethylene oxide/propylene oxide chains.

4. The method of claim 2, in which the emulsifier is present at a concentration of from 0.5 to 50 g/l of emulsion.

5. The method of claim 1, in which the silane is of the General Formula:

$$R_{4-n}\text{—Si—}X_n \quad \text{(I)}$$

wherein

R represents a straight- or branched-chain alkyl group containing from 1 to 18 carbon atoms, or an aryl group, X represents a R'O—, R'COO—, R'NH—, R'$_2$N—, R'=NO— or HO— group, or a halogen atom, and R' represents a straight- or branched-chain alkyl group containing from 1 to 8 carbon atoms, or an aryl group, and n is 1–3;

or of the General Formula:

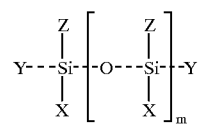

(II)

wherein

Y and Z represent R, R' or X, as just defined, and m is 0–100.

6. The method of claim 5, in which the silane is methyl-trimethoxy-silane.

7. The method of claim 1, in which the silane is used at a concentration of from 0.5 to 20 g/l of emulsion.

* * * * *